United States Patent
Berke et al.

(10) Patent No.: US 8,639,964 B2
(45) Date of Patent: Jan. 28, 2014

(54) SYSTEMS AND METHODS FOR IMPROVING RELIABILITY AND AVAILABILITY OF AN INFORMATION HANDLING SYSTEM

(75) Inventors: Stuart Allen Berke, Austin, TX (US); Mukund Purshottam Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 12/726,277

(22) Filed: Mar. 17, 2010

(65) Prior Publication Data

US 2011/0231697 A1  Sep. 22, 2011

(51) Int. Cl.
  *G06F 11/00*  (2006.01)
(52) U.S. Cl.
  USPC .............................. 714/3; 714/47.1; 714/47.2
(58) Field of Classification Search
  USPC .................. 714/3, 4.1, 5.1, 10, 47.1, 47.2, 48
  See application file for complete search history.

(56) References Cited

U.S. PATENT DOCUMENTS

| | | | |
|---|---|---|---|
| 6,182,249 B1 * | 1/2001 | Wookey et al. | 714/47.2 |
| 7,089,484 B2 | 8/2006 | Chan et al. | |
| 7,555,671 B2 | 6/2009 | Nachimuthu et al. | |
| 7,650,209 B2 | 1/2010 | Fachinger et al. | |
| 7,774,684 B2 | 8/2010 | Bains | |
| 7,882,394 B2 * | 2/2011 | Hosek et al. | 714/48 |
| 2003/0056156 A1 * | 3/2003 | Sauvage et al. | 714/47 |
| 2007/0028149 A1 * | 2/2007 | Desouza et al. | 714/48 |
| 2007/0217168 A1 * | 9/2007 | Masuyama et al. | 361/748 |
| 2007/0260897 A1 * | 11/2007 | Cochran et al. | 713/300 |
| 2008/0022151 A1 | 1/2008 | Stange et al. | |
| 2008/0158990 A1 * | 7/2008 | Wan et al. | 365/185.22 |
| 2008/0307273 A1 * | 12/2008 | Nguyen et al. | 714/704 |
| 2009/0049316 A1 * | 2/2009 | Khatri et al. | 713/320 |
| 2009/0132888 A1 | 5/2009 | Bains et al. | |
| 2009/0164739 A1 | 6/2009 | Harikumar et al. | |
| 2009/0249128 A1 * | 10/2009 | Heckman et al. | 714/47 |

\* cited by examiner

*Primary Examiner* — Joseph D Manoskey
(74) *Attorney, Agent, or Firm* — Baker Botts L.L.P.

(57) ABSTRACT

In one aspect, a method for improving reliability and availability of an information handling system is disclosed. Operational data associated with an operating margin may be captured. A threshold specified by a pre-defined profile may be identified. The pre-defined profile may be useable in adjusting the operating margin. The captured operational data may be compared to the pre-defined threshold. A parameter specified by the pre-defined profile may be identified. The operation of a component of the information handling system may be modified based, at least in part, on the identified parameter specified by the pre-defined profile. The modification may result in adjusting the operating margin.

17 Claims, 3 Drawing Sheets

SYSTEMS AND METHODS FOR IMPROVING RELIABILITY AND AVAILABILITY OF AN INFORMATION HANDLING SYSTEM

TECHNICAL FIELD

The present disclosure relates generally to information handling systems and, more particularly, to systems and methods for improving reliability and availability of an information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Designs for information handling systems, and servers in particular, are increasingly packing more CPUs (central processing units), DIMMs (dual in-line memory modules), HDDs (hard disk drives), I/O (input/output) adapters and other features into the same physical volume. Aside from the normal "Moore's Law" increase in performance and capacity, additional performance enhancements, via features such as multithreading and multi-core features, are allowing systems to run at much higher utilization of the hardware versus several years ago. Additionally, power consumption has become critical to customers, resulting in desire to run a system workload at the lowest possible power consumption.

Unfortunately, as the number and frequency of the computing elements increases, and the voltage rails and electrical loss budgets decrease, overall margins have been reduced to the point where there is little to no "guardband" to protect the hardware from component quality and system noise excursions. Overall link and core timing budgets are shrinking. The probability of a correctable or uncorrectable error is increasing with both frequency and number of components. Moreover, as system power to cool is reduced, component case and junction temperatures increase. While components are still run within their specified operating ranges, their switching speeds slow down (further pressuring timing margins) as they run hotter, and their long term reliability is negatively impacted. Thus, low margin concerns may include, among other things, thermal marginality, low voltage marginality, supplier board and/or connector electrical parameter marginality, and timing marginality issues.

SUMMARY

The present disclosure relates generally to information handling systems and, more particularly, to systems and methods for improving reliability and availability of an information handling system.

In one aspect, a method for improving reliability and availability of an information handling system is disclosed. Operational data associated with an operating margin is captured. A threshold specified by a pre-defined profile is identified. The pre-defined profile is useable in adjusting the operating margin. The captured operational data is compared to the pre-defined threshold. A parameter specified by the pre-defined profile is identified. The operation of a component of the information handling system is modified based, at least in part, on the identified parameter specified by the pre-defined profile. The modification results in adjusting the operating margin.

In another aspect, an information handling system is disclosed. The information handling system includes a processor, a memory system communicatively coupled to the processor, and a computer-readable medium communicatively coupled to the processor. The computer-readable medium has stored thereon executable instructions to cause the processor to: capture operational data associated with an operating margin; identify a threshold specified by a pre-defined profile, where the pre-defined profile is useable in adjusting the operating margin; compare the captured operational data to the pre-defined threshold; identify a parameter specified by the pre-defined profile; and modify the operation of a component of the information handling system based, at least in part, on the identified parameter specified by the pre-defined profile, where the modification results in adjusting the operating margin.

In yet another aspect, a computer program, stored in a tangible medium, for improving reliability and availability of an information handling system is disclosed. The computer program includes executable instructions to cause a processor to: capture operational data associated with an operating margin; identify a threshold specified by a pre-defined profile, wherein the pre-defined profile is useable in adjusting the operating margin; compare the captured operational data to the pre-defined threshold; identify a parameter specified by the pre-defined profile; and modify the operation of a component of the information handling system based, at least in part, on the identified parameter specified by the pre-defined profile, where the modification results in adjusting the operating margin.

Thus, the present disclosure provides systems and methods for improving reliability and availability of an information handling system. Certain embodiments may provide for improving an operating margin that may include one or more of a thermal margin, a frequency margin, a voltage margin, a timing margin, a memory cell retention margin, an error rate margin, and a signal integrity margin. Certain embodiments may provide for improving operating margins for customers that may wish to optimize or prioritize operation for RAS (reliability, availability and serviceability) versus high performance or power efficiency. Certain embodiments may provide for improved error resolution and may further provide for preventive measures and/or reactive measures to respond to errors dynamically while the system is running or via reboot. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
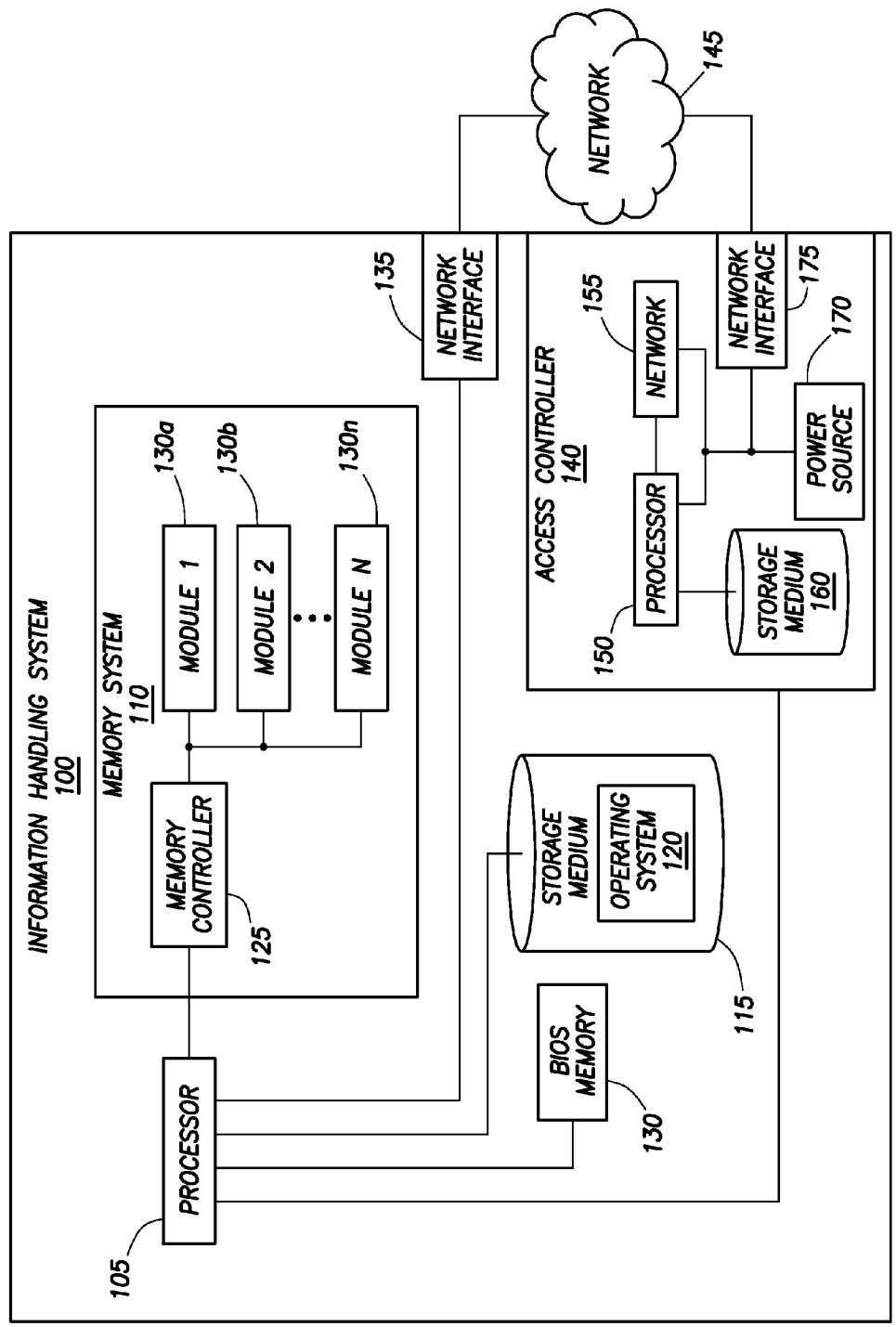
FIG. 1 illustrates a block diagram of an example information handling system that may be configured to operated in a RAS (reliability, availability, and serviceability) optimized operational mode, in accordance with certain embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, for example without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100 that may be configured to operated in a RAS (reliability, availability, and serviceability) optimized operational mode, in accordance with certain embodiments of the present disclosure. In certain embodiments, information handling system 100 may comprise a computer chassis or enclosure (e.g., a server chassis holding one or more server blades). In other embodiments, information handling system 100 may be a personal computer (e.g., a desktop computer or a portable computer). As depicted in FIG. 1, information handling system 100 may include a processor 105, a memory system 110 communicatively coupled to processor 105, and a storage medium 115 communicatively coupled to processor 105.

Processor 105 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 105 may interpret and/or execute program instructions and/or process data stored and/or communicated by one or more of memory system 110, storage medium 115, and/or another component of information handling system 100. Processor 105 may be coupled to other components (not shown) with optional interfaces (I/Fs) via a PCIe (Peripheral Component Interconnect Express) interface, for example.

Memory system 110 may be communicatively coupled to processor 105 and may comprise any system, device, or apparatus operable to retain program instructions or data for a period of time (e.g., computer-readable media). For example without limitation, memory system 110 may comprise RAM, EEPROM, a PCMCIA card (Personal Computer Memory Card International Association standard conformant expansion card), flash memory, magnetic storage, opto-magnetic storage, or any suitable selection and/or array of volatile or non-volatile memory that retains data after power to information handling system 100 is turned off. In particular embodiments, memory system 110 may comprise dynamic random access memory (DRAM).

As shown in FIG. 1, memory system 110 may include memory controller 125, one or more memory modules 130a-130n communicatively coupled to memory controller 125. Memory controller 125 may be any system, device, or apparatus configured to manage and/or control memory system 110. For example, memory controller 125 may be configured to read data from and/or write data to memory modules 130 comprising memory system 110. Additionally or alternatively, memory controller 125 may be configured to refresh memory modules in embodiments in which memory system 110 comprises DRAM or another type of volatile memory. Although memory controller 125 is shown in FIG. 1 as an integral component of memory system 110, memory controller 125 may be separate from memory system 110 and/or may be an integral portion of another component of information handling system 100 (e.g., memory controller 125 may be integrated into processor 105). Each memory module 130 may include any system, device or apparatus configured to retain program instructions and/or data for a period of time (e.g., computer-readable media). Each memory module 130 may include a DRAM module (e.g., a dual in-line package (DIP) memory, a Single In-line Pin Package (SIPP) memory, a Single Inline Memory Module (SIMM), a Ball Grid Array (BGA)), or any other suitable memory.

Storage medium 115 may be communicatively coupled to processor 105. Storage medium 115 may include any system, device, or apparatus operable to store information processed by processor 105. Storage medium 115 may include, for example, network attached storage, one or more direct access storage devices (e.g., hard disk drives), and/or one or more sequential access storage devices (e.g., tape drives). As shown in FIG. 1, storage medium 115 may have stored thereon an operating system (OS) 120. OS 120 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 120. Active portions of OS 120 may be transferred to memory 110 for execution by processor 105.

A basic input/output system (BIOS) memory 130 may be included in or be separate from the memory system 110. A flash memory or other nonvolatile memory may be used as the BIOS memory 130. A BIOS program (not expressly shown) may typically be stored in the BIOS memory 130. The BIOS program may include software that facilitates interaction with and between the information handling system 110 devices such as a keyboard (not expressly shown), a mouse (not expressly shown), and/or one or more I/O devices. The BIOS memory 130 may also store system code (note expressly shown) operable to control a plurality of basic information handling system 110 operations. Information handling system 100 may operate by executing BIOS for a system firmware in response to being powered up or reset. BIOS may identify and initialize components of system 100 and cause an operating system to be booted.

As depicted in FIG. 1, information handling system 100 may also include a network interface 135 communicatively coupled to processor 105, and an access controller 140 coupled to processor 105. Network interface 135 may include any suitable system, apparatus, or device operable to serve as an interface between information handling system 100 and network 145. Network interface 135 may enable information handling system 100 to communicate over network 145 using any suitable transmission protocol and/or standard, including without limitation all transmission protocols and/or standards enumerated below with respect to the discussion of network 145. In certain embodiments, network interface 135 may be configured with hardware, software, and/or firmware to allow its associated information handling system 100 to remotely boot from a computer-readable medium remote from information handling system 100 (e.g., a computer-readable medium coupled to network interface 135 via network 145).

Access controller 140 may be any system, device, apparatus or component of information handling system 100 configured to permit an administrator or other person to remotely monitor and/or remotely manage information handling system 100 (e.g., via an information handling system remotely connected to information handling system 100 via network 145) regardless of whether information handling system 100 is powered on and/or has an operating system installed thereon. In certain embodiments, access controller 140 may allow for "out-of-band" control of information handling system 100, such that communications to and from access controller 140 are communicated via a management channel physically isolated from the "in band" communication with network interface 135. Thus, for example, if a failure occurs in information handling system 100 that prevents an administrator from remotely accessing information handling system 100 via network interface 135 (e.g., operating system failure, power failure, etc.), the administrator may still be able to monitor and/or manage the information handling system 100 (e.g., to diagnose problems that may have caused failure) via access controller 140. In the same or alternative embodiments, access controller 140 may allow an administrator to remotely manage one or more parameters associated with operation of information handling system 100 (e.g., power usage, processor allocation, memory allocation, security privileges, etc.). In certain embodiments, access controller 140 may include or may be a Baseboard management Controller (BMC), a Management Engine (ME), or an integral part of a Dell Remote Access Controller (DRAC) or an Integrated Dell Remote Access Controller (iDRAC).

As depicted in FIG. 1, access controller 140 may include a processor 150, a memory 155 communicatively coupled to processor 150, storage media 160, a network interface 175 communicatively coupled to processor 150, and a power source 170 electrically coupled to processor 150. Processor 150 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 150 may interpret and/or execute program instructions and/or process data stored in memory 155 and/or another component of information handling system 100.

Memory 155 may be communicatively coupled to processor 150 and may include any system, device, or apparatus configured to retain program instructions and/or data for a period of time (e.g., computer-readable media). By way of example without limitation, memory 155 may include RAM, EEPROM, a PCMCIA card, flash memory, magnetic storage, opto-magnetic storage, or any suitable selection and/or array of volatile or non-volatile memory that retains data after power to information handling system 100 is turned off or power to access controller 140 is removed. Network interface 175 may include any suitable system, apparatus, or device operable to serve as an interface between access controller 140 and network 145. Network interface 175 may enable access controller 100 to communicate over network 145 using any suitable transmission protocol and/or standard, including without limitation all transmission protocols and/or standards enumerated below with respect to the discussion of network 145.

In operation, the information handling system 100 may implement a RAS optimized operational mode that seeks to optimize system or subsystem operating characteristics for improved reliability, availability and serviceability. In various embodiments, the RAS operational mode may be set in BIOS, or via in-band or out-of-band system management. The RAS mode may be static (e.g., permanent), dynamic (e.g., triggered while system is running by a correctable or uncorrectable event or threshold crossing), or sticky (e.g., persistent through reboots or AC power cycles until cleared).

of the first column. Profile 1 illustrates an emphasis on high reliability and availability. Profile 2 illustrates an emphasis on performance per power consumption. Profile 3 illustrates an emphasis on high performance.

TABLE 1

| Run-Time and After Reboot Adjustment | Margin Improved | Profile 1: High Reliability & Availability | Profile 2: Performance/Watt | Profile 3: High Performance |
|---|---|---|---|---|
| Increase Fan Speed | Thermal Timing | Improve Thermal Margin By 20° C. Over Component Requirements | Meet Component Requirements Thermal Throttling As Needed May Depend On CLTT | Improve Thermal Margin by 10° C. Over Component Requirements Eliminate Throttling Possibility |
| Increase Voltage Regulator Output Voltage | Timing SI | Top of Allowed Range | Bottom of Allowed Range To Save Power | Top of Allowed Range |
| Increase Refresh Rate | Timing Memory Cell Charge | 2x or Higher As Supported By Memory Controller | 1x | 1x |
| Increase Patrol Scrubbing Rate | Memory Cell Charge Soft Error Rate | Once per Hour | Once per Day | Once per Week |
| Decrease Link Speed | Timing SI | Lowest Speed (e.g., 2.5 GT/s) | Medium Speed (e.g., 5.0 GT/s) | Highest Speed (e.g., 10 GT/s) |

A RAS optimization may be governed according to policies. The information handling system 100 may be configured with a set of default recommended response policies. Policies may be used to govern operating margins such as thermal guardband, frequency guardband, timing margin, and/or voltage margins. Policies may be set per subsystem (e.g., memory, PCIe, CPU). Policies may be provided to govern system response to errors by error type (e.g., correctable, uncorrectable, CRC (cyclical redundancy checking), parity), error rate, and/or error threshold. In addition, policies may invoke a higher level RAS capability either while the system is operating or via reboot.

The implementation of policies may be specified by one or more user optimization profiles. A user optimization profile, for example, may emphasize and place a higher priority on performance. By contrast, another user profile may emphasize high reliability and availability. Yet another profile may seek a certain balance between performance and power consumption. For each case, the user may specify the minimum desired operating margins for the affected system or subsystem (such as memory, PCIe, CPU, etc.) such as thermal guardband, frequency guardband, timing margin, voltage margin, high speed link SI (signal integrity) eye margin, etc. Exemplary embodiments are described below.

Shown in Table 1 is an exemplary listing of operations that may be included in one or more policies for a RAS optimized operational mode. Many other system features may also be included in these policies based on system architecture, OS support, etc. The operations correspond to user profile optimizations. In the first column are listed exemplary optimization operations that may be implemented either during run-time or via a reboot adjustment. The second column indicates the corresponding margins that may be improved for each operation. The third, fourth and fifth columns indicate exemplary user profiles for system optimization and how each profile may relate to the operations and margins—more particularly, by further specifying parameters for the operations As Table 1 illustrates, numerous operating parameters may be controlled advantageously in a RAS optimized operational mode, in order to statically, dynamically, or adaptively improve reliability and availability. A RAS optimized mode may include one or more policies to define and control a thermal guardband. A thermal guardband may be provided for a CLTT (closed loop thermal throttling) or OLTT (open loop thermal throttling) subsystem, such as memory, CPU or a power supply unit (PSU). Such thermal guardbands may ensure that component case and junction temperatures are controlled, thereby maintaining operation within specified operating ranges. Consequently, switching speeds are maintained such that timing margins may be optimized.

The RAS optimized operational mode also may improve thermal margins and timing margins by system bandwidth throttling in addition to or in the alternative to running fans faster (e.g., to reduce case and junction temperature). System and/or bandwidth throttling may aid temperature margin management and may particularly suited to user optimization profiles that seek a certain balance between performance and power consumption. Profile 2, for example, may further specify that the governing policy target thermal and timing margins adjusted to meet component requirements. With such a profile, bandwidth throttling may be implemented on an as-needed basis, may be a measure that is secondary to increasing fan speeds, and may be implemented when a power consumption compromise favors throttling over further increases in fan speeds. Profiles 1 and 3, by contrast, may eliminate the need or possibility for throttling due to more substantial thermal margin targets. Profile 1, with an emphasis on high reliability and availability, may target a robust margin such as 20° C. over component requirements, for example. Profile 3 may target a lower margin, such as 10° C. over component requirements, for example.

To improve timing margins and signal integrity margins, the RAS optimized operational mode may also employ one or more policies that define and control voltage regulator set points with respect to a valid operating range. Voltage regulator set points in subsystems such as CPU or memory, for example, may be increased to maximum operating set points within valid operating ranges. Maximum operating set points may particularly suited to user optimization profiles where power consumption is less of a priority, as is the case with the exemplary Profiles 1 and 3. Conversely, user optimization profiles focusing on efficient power consumption, such as Profile 2, may target set points at or near the minimum set points within valid operating ranges.

The RAS optimized operational mode may improve timing margins as well as memory cell charge margins by one or more policies that define and control memory refresh rates, which in turn impact timing margins. A cell retention margin may be improved, for example, by increasing the memory refresh rate. For user optimization profiles such as exemplary Profile 1 that target high reliability and availability, the memory refresh rate may be increased twofold or higher, as may be supported by the particular memory controller.

The RAS optimized operational mode also may improve memory cell charge margins, and soft error rates by one or more policies that define and control patrol scrub rate on subsystems such as memory or HDDs. For user optimization profiles such as exemplary Profile 1 that target high reliability and availability, the patrol scrubbing rate may be increased to a high frequency such as once per hour. High performance user optimization profiles, however, may avoid frequent patrol scrubbing and its impact on performance by scheduling a less frequent basis such as once per week.

To improve timing margins and signal integrity margins, the RAS optimized operational mode may employ one or more policies that define and control link speeds. For example, serial link speed may be decreased for serial links such as QPI (Intel QuickPath Interconnect), HT (AMD HyperTransport), PCIe (Peripheral Component Interconnect Express), and SAS (Serial Attached Small Computer System Interface). User optimization profiles emphasizing high reliability and availability may employ the greatest decrease in link speeds and may involve decreases to speeds on the order of 2.5 GT/s (gigatransfers per second), for example. User optimization profiles emphasizing high performance may employ the lowest decrease in link speeds and may only involve decreases to speed son the order of 10 GT/s, for example.

The RAS optimized operational mode may implement one or more policies that optimize via reboot adjustments. Shown in Table 2 is an exemplary listing of operations that may be included in one or more policies for a RAS optimized operational mode and that may be implemented via reboot adjustment. Again, many other system features may also be included in these policies based on system architecture, OS support, etc.

TABLE 2

| After Reboot Adjustment | Margin Improved | Profile 1: High Reliability & Availability | Profile 2: Performance/ Watt | Profile 3: High Performance |
| --- | --- | --- | --- | --- |
| Reduce DDR Operating Frequency | Timing SI | 1067 MT/s or 800 MT/s | 1067 MT/s | 1333 MT/s |
| Increase DDR Access Latency | DRAM Internal Timing Margin | 15.0 ns 8-8-8 (at 1067 MT/s) or 15.0 ns 6-6-6 (at 800 MT/s) | 13.1 ns 7-7-7 (Industry Standard) | 12.0 ns 8-8-8 (Premium) or 13.5 ns 9-9-9 (Standard) |

TABLE 2-continued

| After Reboot Adjustment | Margin Improved | Profile 1: High Reliability & Availability | Profile 2: Performance/ Watt | Profile 3: High Performance |
| --- | --- | --- | --- | --- |
| Increase DDR Voltage | Timing SI | 1.5 V | 1.35 V | 1.5 V |
| Increase DDR Channel RAS Mode | Soft Error Rate Hard Error Rate | Sparing & DDR Channel Lockstep on 2/4 Channel Sockets | Independent Channel | Independent Channel |

For example, to improve timing margins and signal integrity margins, the RAS optimized operational mode may implement one or more policies that reduce DDR (double data rate) operating frequency. Decreasing clock frequency may be on a system or a sub-system basis. User optimization profiles that emphasize high performance may employ lesser reductions, as compared to other profiles. User optimization profiles that emphasize high availability and reliability may employ greater reductions.

The RAS optimized operational mode also may implement one or more policies that increase DDR access latency (i.e., access time) on subsystems such as memory and increase DDR voltage. The corresponding margins improved may include one or more of timing margins, and signal integrity margins. Increasing the DRAM access latencies allows more time for internal transfers to settle and complete within the DRAM. Channel and DRAM timing margins may be improved by raising memory VDD slightly, thereby accepting a trade-off in power efficiency.

The RAS optimized operational mode may implement one or more policies that increase DDR channel RAS mode. The corresponding margins improved may include one or more of soft error rates and hard error rates. "Soft" errors are those that are intermittent or transitory in nature, due to random noise, alpha particles, anomalous events, etc. The underlying hardware element is still functional after the event has passed. "Hard" errors are permanent errors in which the underlying hardware element is no longer functional, and must be avoided until it can be replaced. The RAS optimized operational mode may further enable a higher level of redundancy via one or more of channel lockstep, sparing, mirroring, and higher RAID (redundant array of inexpensive disks) equivalent levels of memory redundancy.

Additionally, optional error checking may be employed. CRC error checking may be employed with links such as variants of double data rate synchronous dynamic random access memory interfaces (e.g., DDR4 DRAMs). Moreover, command/address parity checking may be implemented with such interfaces. End-to-end CRC error checking may be employed with serial links such as PCIe and SAS.

In certain embodiments, a system may be configured to normally optimize for performance per Watt. When a certain memory correctable error rate or type is observed, the system may be configured to automatically make improvements. A memory thermal margin may be improved by running fans faster and/or bandwidth throttling. A cell retention margin may be improved by invoking double refresh rate. Channel and DRAM timing margins may be improved by raising memory VDD (power supply voltage) slightly, thereby accepting a trade-off with respect to power efficiency. Removal of soft errors may be improved via increased patrol scrub rate. Channel resilience may be improved by turning on optional parity and CRC checking.

Figure 2:
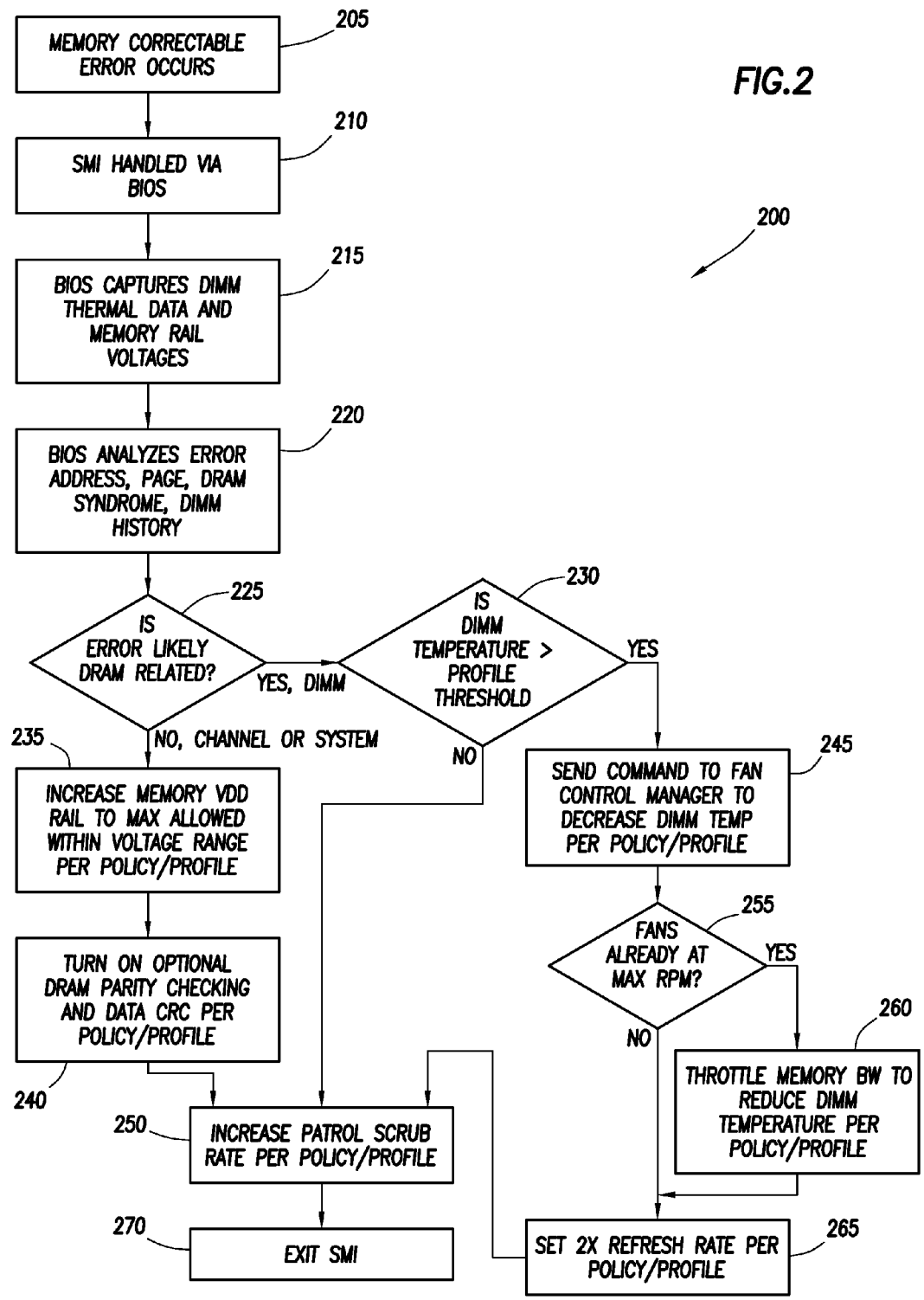
FIG. 2 illustrates a flow chart of an example method for handling a memory correctable error, in accordance with certain embodiments of the present disclosure.

FIG. 2 illustrates a flow chart of an example method 200 for handling a memory correctable error, in accordance with certain embodiments of the present disclosure. Responses to errors in other sub-systems may be similarly defined. According to one embodiment, method 200 may begin at step 205. Teachings of the present disclosure may be implemented in a variety of configurations of information handling system 100. As such, the order of the steps comprising method 200 may depend on the implementation chosen.

At step 205, a memory correctable error occurs. At step 210, a system management interrupt (SMI) may be issued. The interrupt may be handled via BIOS. At step 215, the BIOS may capture thermal data and memory rail voltages of a memory module, such as a DIMM.

At step 220, the BIOS may analyze one or more of the error address, page, DRAM, syndrome, and DIMM history. It may be determined at step 225 whether the error likely is DRAM related. If it is determined that the error likely is DRAM related, the method 200 may proceed to step 230. Otherwise, the method 200 may proceed to step 235, where a memory VDD rail may be increased to a maximum allowed level within the voltage range per the governing policy. At step 240, optional DRAM parity checking and data CRC may be turned on per the governing policy.

At step 230, in response to a determination that the error likely is DRAM related, it may be further determined if the temperature of the memory module is greater than a threshold defined in a governing profile. If it is determined that the temperature is greater than the threshold, then the method 200 may proceed to step 245. Otherwise, the method 200 may proceed to step 250.

At step 245, in response to a determination that the temperature is greater than the threshold, a command may be sent to a fan control manager to decrease the temperature of the memory module per the governing policy. Proceeding to step 255, it may be determined whether one or more fans are operating at a maximum level. If it is determined that the one or more fans are operating at a maximum level, then the method 200 may proceed to step 260. Otherwise, the method 200 may proceed to step 265.

At step 260, in response to a determination that the one or more fans are operating at a maximum level, memory bandwidth may be throttled to reduce the temperature of the memory module per the governing policy. At step 265, the refresh rate may be increased per the governing policy. At step 250, the patrol scrub rate may be increased per the governing policy. At step 270, the method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. Method 200 may be implemented using information handling system 100 or any other system operable to implement method 200. Although FIG. 2 indicates the involvement of BIOS in implementing certain steps of method 200, it should be understood that via in-band or out-of-band system management may be involved in the alternative. In certain embodiments, method 200 may be implemented partially or fully in software and/or firmware embodied in computer-readable media.

Figure 3:
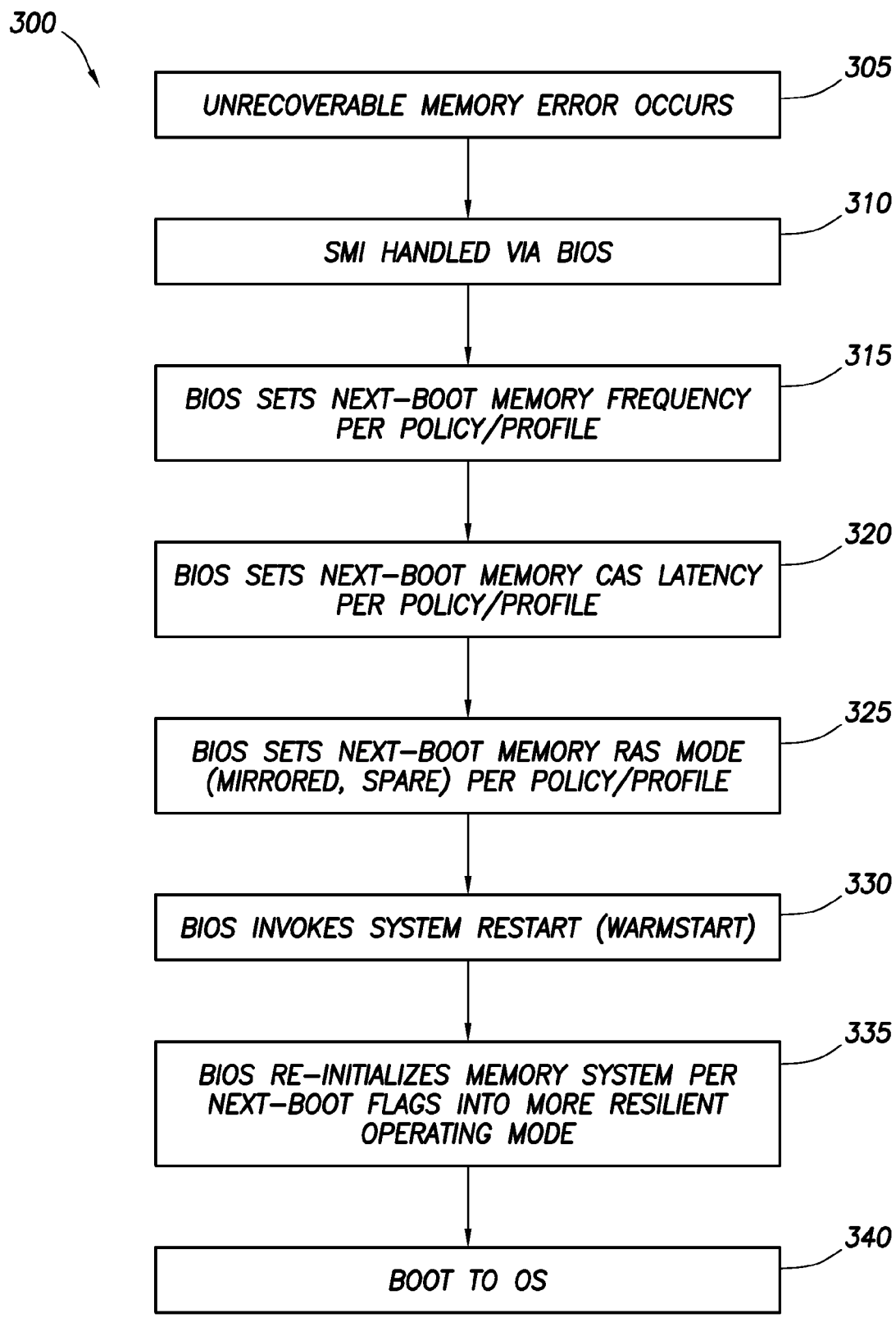
FIG. 3 illustrates a flow chart of an example method for handling an unrecoverable memory error, in accordance with certain embodiments of the present disclosure.

In certain embodiments, a system could also specify that, if an uncorrectable memory error occurs, the system may reboot at a slower DDR frequency with increased CAS latency in memory mirrored mode. FIG. 3 illustrates a flow chart of an example method 300 for handling an unrecoverable memory error, in accordance with certain embodiments of the present disclosure. Responses to errors in other sub-systems may be similarly defined. According to one embodiment, method 300 may begin at step 305. Teachings of the present disclosure may be implemented in a variety of configurations of information handling system 100. As such, the order of the steps comprising method 300 may depend on the implementation chosen.

At step 305, an unrecoverable memory error occurs. At step 310, a system management interrupt may be issued. The interrupt may be handled via BIOS. At step 315, the BIOS may set a memory frequency to be implemented with the next boot of the information handling system 100. At step 320, the BIOS may set a latency parameter, such as column address strobe latency, to be implemented with the next boot of the information handling system 100. At step 325, the BIOS may set a memory RAS mode, such as a mirrored or spare mode per the governing policy, to be implemented with the next boot. At step 330, the BIOS may invoke a system restart (e.g., a "warm start"). At step 335, the BIOS may re-initialize the memory system, per next-boot flags, into more resilient operating mode. At step 340, a boot to the OS may be invoked, and the method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. Method 300 may be implemented using information handling system 100 or any other system operable to implement method 300. Although FIG. 3 indicates the involvement of BIOS in implementing certain steps of method 300, it should be understood that via in-band or out-of-band system management may be involved in the alternative. In certain embodiments, method 300 may be implemented partially or fully in software and/or firmware embodied in computer-readable media.

Thus, the present disclosure provides systems and methods for improving reliability and availability of an information handling system. Certain embodiments may provide for improving an operating margin that may include one or more of a thermal margin, a frequency margin, a voltage margin, a timing margin, a memory cell retention margin, an error rate margin, and a signal integrity margin. Certain embodiments may provide for improving operating margins for customers that may wish to optimize operation for RAS (reliability, availability and serviceability) versus high performance or power efficiency. Certain embodiments may provide for improved error resolution and may further provide for preventive measures and/or reactive measures to respond to errors dynamically while the system is running or via reboot. Other technical advantages will be apparent to those of ordinary skill in the art in view of the specification, claims and drawings.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for improving reliability and availability of an information handling system, the method comprising:
   capturing operational data associated with an operating margin;
   identifying a threshold specified by a user pre-defined profile, wherein the user pre-defined profile is useable in adjusting the operating margin, wherein the user pre-defined profile is included in a policy that at least partially controls a subsystem of the information handling system;
   wherein the operating margin includes a thermal margin, a frequency margin, a voltage margin, a timing margin, and at least one of a memory cell retention margin, an error rate margin, and a signal integrity margin;
   comparing the captured operational data to the user pre-defined threshold;
   identifying a parameter specified by the user pre-defined profile; and
   modifying the operation of a component of the subsystem of the information handling system based, at least in part, on the identified parameter specified by the user pre-defined profile, wherein the modification results in adjusting the operating margin.

2. The method according to claim 1, further comprising:
   receiving an error notification associated with the operating margin prior to capturing operational data associated with the operating margin.

3. The method according to claim 2, further comprising:
   consequent to receiving the error notification, setting the modification of the operation of the component of the information handling system to occur along with a subsequent boot of the information handling system.

4. The method according to claim 1, wherein the modification of the operation of the component of the information handling system does not occur until after a subsequent boot of the information handling system.

5. The method according to claim 1, wherein the user pre-defined profile is useable in adjusting the operating margin to improve performance of the information handling system.

6. The method according to claim 1, wherein the user pre-defined profile is useable in adjusting the operating margin to improve power efficiency of the information handling system.

7. An information handling system, comprising:
   a processor;
   a memory system communicatively coupled to the processor;
   a computer-readable medium communicatively coupled to the processor and having stored thereon executable instructions to cause the processor to:
      capture operational data associated with an operating margin;
      identify a threshold specified by a user pre-defined profile, wherein the user pre-defined profile is useable in adjusting the operating margin, wherein the user pre-defined profile is included in a policy that at least partially controls a subsystem of the information handling system;
      wherein the operating margin includes a thermal margin, a frequency margin, a voltage margin, a timing margin, and at least one of a memory cell retention margin, an error rate margin, and a signal integrity margin;
      compare the captured operational data to the user pre-defined threshold;
      identify a parameter specified by the user pre-defined profile; and
      modify the operation of a component of the subsystem of the information handling system based, at least in part, on the identified parameter specified by the user pre-defined profile, wherein the modification results in adjusting the operating margin.

8. The information handling system according to claim 7, wherein executable instructions cause the processor to:
   receive an error notification associated with the operating margin prior to capturing operational data associated with the operating margin.

9. The information handling system according to claim 7, wherein the modification of the operation of the component of the information handling system does not occur until after a subsequent boot of the information handling system.

10. The information handling system according to claim 7, wherein the user pre-defined profile is useable in adjusting the operating margin to improve performance of the information handling system.

11. The information handling system according to claim 7, wherein the user pre-defined profile is useable in adjusting the operating margin to improve power efficiency of the information handling system.

12. A non-transitory computer-readable storage medium, storing a computer program for improving reliability and availability of an information handling system, including executable instructions to cause a processor to:
   capture operational data associated with an operating margin;
   identify a threshold specified by a user pre-defined profile, wherein the user pre-defined profile is useable in adjusting the operating margin, wherein the user pre-defined profile is included in a policy that at least partially controls a subsystem of the information handling system;
   wherein the operating margin includes a thermal margin, a frequency margin, a voltage margin, a timing margin, and at least one of a memory cell retention margin, an error rate margin, and a signal integrity margin;
   compare the captured operational data to the user pre-defined threshold;
   identify a parameter specified by the user pre-defined profile; and
   modify the operation of a component of the subsystem of the information handling system based, at least in part, on the identified parameter specified by the user pre-defined profile, wherein the modification results in adjusting the operating margin.

13. The non-transitory computer-readable storage medium according to claim 12, wherein executable instructions cause the processor to:
   receive an error notification associated with the operating margin prior to capturing operational data associated with the operating margin.

14. The non-transitory computer-readable storage medium according to claim 13, wherein executable instructions cause the processor to:
   consequent to receiving the error notification, set the modification of the operation of the component of the information handling system to occur along with a subsequent boot of the information handling system.

15. The non-transitory computer-readable storage medium according to claim 12, wherein the modification of the operation of the component of the information handling system does not occur until after a subsequent boot of the information handling system.

16. The non-transitory computer-readable storage medium according to claim 12, wherein the user pre-defined profile is useable in adjusting the operating margin to improve performance of the information handling system.

17. The non-transitory computer-readable storage medium according to claim 12, wherein the user pre-defined profile is useable in adjusting the operating margin to improve power efficiency of the information handling system.

* * * * *